United States Patent [19]

Sandin

[11] Patent Number: 5,441,752
[45] Date of Patent: Aug. 15, 1995

[54] INFUSION BAG DEVICE

[76] Inventor: Sonja A. Sandin, 105 Alleyne Dr., Pittsburgh, Pa. 15215

[21] Appl. No.: 164,963

[22] Filed: Dec. 10, 1993

[51] Int. Cl.$^6$ .................. B65B 29/02; B65D 81/34
[52] U.S. Cl. ........................ 426/82; 426/77; 426/80; 99/287
[58] Field of Search ................... 426/77-84, 426/110, 86, 112, 115, 120, 124, 435, 433; 99/287, 316, 321, 323

[56] References Cited

U.S. PATENT DOCUMENTS

| 476,568 | 6/1892 | Smith | 99/320 |
|---|---|---|---|
| 627,166 | 6/1899 | White | 99/320 |
| 802,378 | 10/1905 | Ellis | 99/287 |
| 1,889,111 | 11/1932 | Serr | 426/86 |
| 2,304,004 | 12/1942 | Low | 99/323 |
| 2,801,736 | 8/1957 | Grow | 426/77 |
| 2,935,928 | 5/1960 | Keating et al. | 99/287 |
| 2,972,406 | 2/1961 | Mayer | 426/86 |
| 3,121,636 | 2/1964 | Toms | 426/86 |
| 3,164,289 | 1/1965 | Cocchiarella | 426/112 |
| 3,348,469 | 10/1967 | Kasakoff | 99/320 |
| 3,407,922 | 10/1968 | Palmer | 426/86 |
| 3,657,994 | 4/1972 | Post | 426/82 |
| 3,927,608 | 12/1975 | Doyel | 99/287 |
| 3,974,758 | 8/1976 | Stone | 426/124 |
| 3,987,941 | 10/1976 | Blessing | 426/124 |
| 4,061,782 | 12/1977 | Baxter | 426/86 |
| 4,723,674 | 2/1988 | Nunes | 426/124 |
| 4,806,369 | 2/1989 | Thompson | 426/86 |
| 4,867,993 | 9/1989 | Nordskug | 426/82 |
| 4,869,159 | 9/1989 | Yan | 99/323 |
| 4,988,019 | 1/1991 | Dawes | 426/80 |

FOREIGN PATENT DOCUMENTS

| 1002001 | 12/1976 | Canada | 426/77 |
|---|---|---|---|
| 820702 | 11/1951 | Germany | 426/86 |
| 2345892 | 3/1975 | Germany | 426/86 |
| 6062946 | 4/1985 | Japan | 426/86 |
| 1436397 | 5/1976 | United Kingdom | 426/77 |
| 2174890 | 11/1986 | United Kingdom | 426/86 |
| 2178948 | 2/1987 | United Kingdom | 426/77 |
| 2229991 | 10/1990 | United Kingdom | 426/77 |

Primary Examiner—Steven Weinstein
Attorney, Agent, or Firm—Patrick Garrett

[57] ABSTRACT

The present invention is a beverage device. The beverage device comprises a beverage pack for adding flavor to a liquid, such as water. The beverage pack can be a tea bag but is not limited thereto. For instance, the beverage pack can also have coffee or mulling spices, as examples. The beverage device also comprises shield means for encapsulating the beverage pack within a bottom of a cup. The shield means is preferably connected to the beverage pack with a string. In one embodiment the shield means is collapsible from an open orientation to a closed orientation. In the open orientation the shield means provides flow channels for allowing the beverage pack to steep. In the closed orientation the flow channels are closed. Preferably the shield means comprises a first portion and a second portion. The first portion is slidably connected to the second portion to allow the shield means to be moved from the open orientation to closed orientation. There can also be a stick member, such as stirrer, for pushing the shield means to the bottom of the cup. The cup can have a notch portion at the bottom for engaging with the shield means. Preferably the shield means comprises sealing material, such as sponge, disposed on its periphery to seal the shield means against the sides of the cup. Sealing material can also be disposed between the first and second portions for sealing them together when they are in the closed orientation.

13 Claims, 1 Drawing Sheet

INFUSION BAG DEVICE

FIELD OF THE INVENTION

The present invention is related in general to tea bags and the like. More specifically the present invention is related to a device for encapsulating a tea bag within the bottom of a cup for clean efficient disposal.

BACKGROUND OF THE INVENTION

Tea is one of the most popular drinks in the world. One convenient way of steeping tea is with tea bag. Unfortunately, a wet tea bag is unsightly and a messy thing to handle and dispose of. The present invention discloses a unique device for use with a tea bag which allows the tea bag to be isolated within the bottom of a cup.

SUMMARY OF THE INVENTION

The present invention is a beverage device. The beverage device comprises a beverage pack for adding flavor to a liquid, such as water. The beverage pack can be a tea bag but is not limited thereto. For instance, the beverage pack can also have coffee or mulling spices, as examples. The beverage device also comprises shield means for encapsulating the beverage pack within a bottom of a cup. The shield means is preferably connected to the beverage pack with a string.

In one embodiment the shield means is collapsible from an open orientation to a closed orientation. In the open orientation the shield means provides flow channels for allowing the beverage pack to steep. In the closed orientation the flow channels are closed. Preferably the shield means comprises a first portion and a second portion. The first portion is slidably connected to the second portion to allow the shield means to be moved from the open orientation to closed orientation. There can also be a stick member, such as stirrer, for pushing the shield means to the bottom of the cup. The cup can have a notch portion at the bottom for engaging with the shield means. Preferably the shield means comprises sealing material, such as sponge, disposed on its periphery to seal the shield means against the sides of the cup. Sealing material can also be disposed between the first and second portions for sealing them together when they are in the closed orientation.

DESCRIPTION OF THE PREFERRED EMBODIMENT

Figure 1:
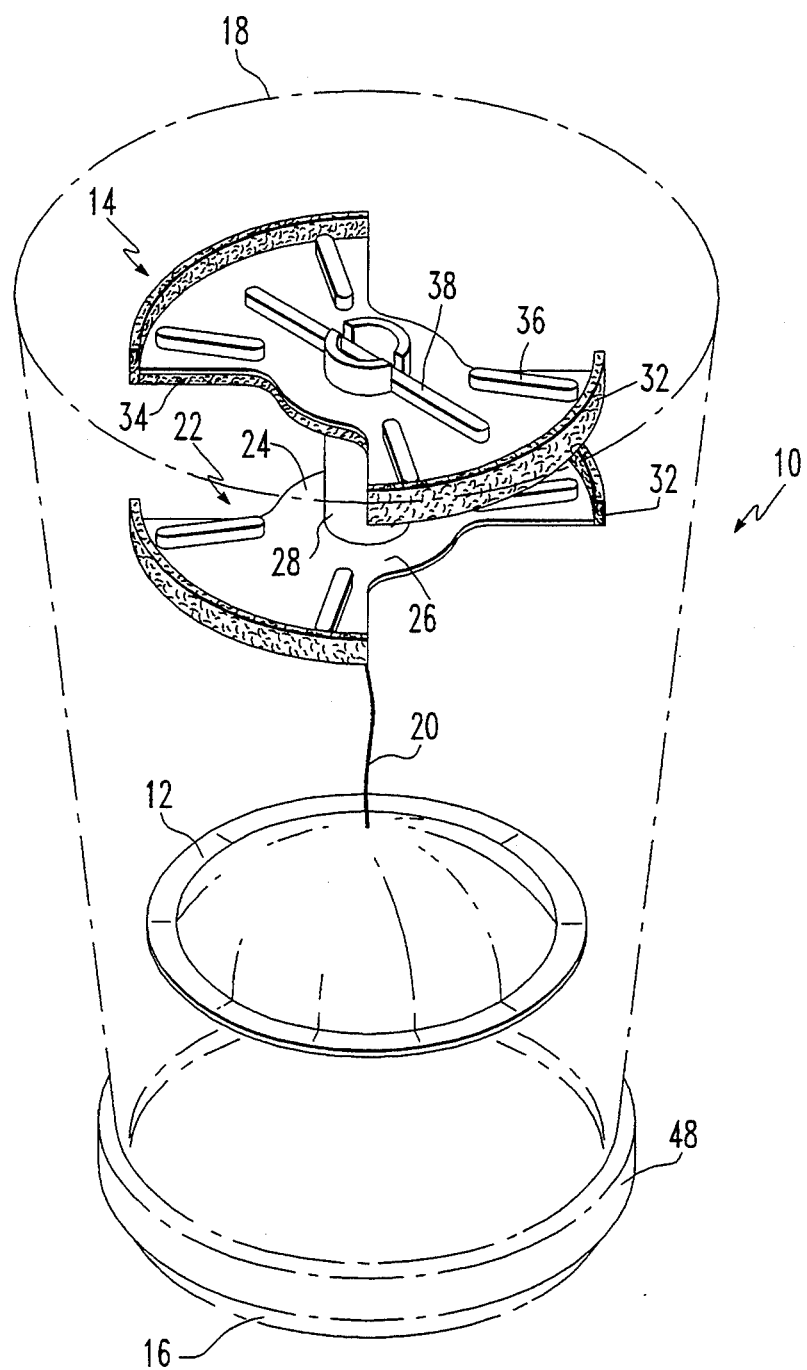
FIG. 1 is a schematic representation showing the beverage device with the shield means in the open orientation.

Referring now to the drawings wherein like reference numerals refer to similar or identical parts throughout the several views and more specifically to FIG. 1 thereof there is shown a beverage device 10. The beverage device 10 comprises a beverage pack 12 for adding flavor to a liquid, such as water. The beverage pack 12 can be a tea bag but is not limited thereto. For instance, the beverage pack 12 can also have coffee or mulling spices, as examples. The beverage device 10 also comprises shield means 14 for encapsulating the beverage pack 12 within a bottom 16 of a cup 18. The shield means 14 is preferably connected to the beverage pack with a string 20.

Figure 2:
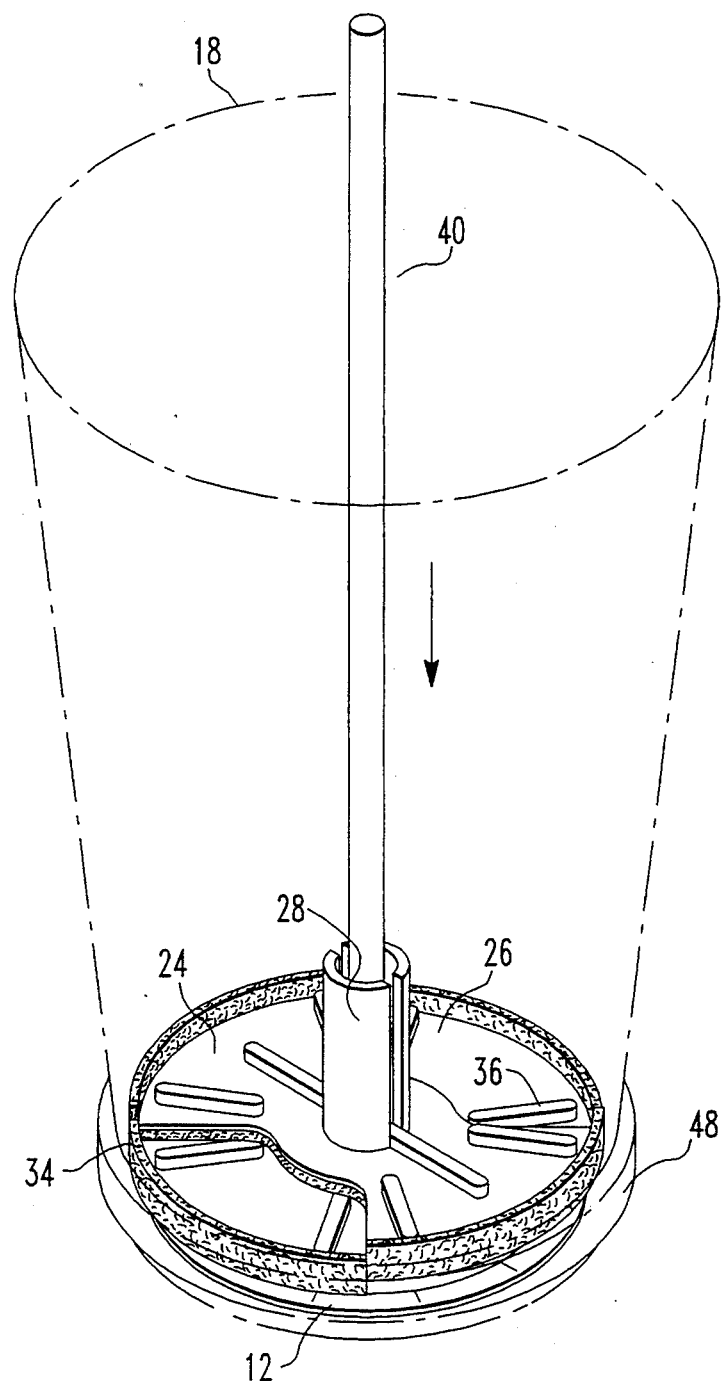
FIG. 2 is a schematic representation showing the beverage device with the shield means in the closed position.

In one embodiment the shield means 14 is collapsible from an open orientation, as shown in FIG. 1, to a closed orientation, as shown in FIG. 2. In the open orientation the shield means 14 provides flow channels 22 for allowing the beverage pack 12 to steep. In the closed orientation the flow channels 22 are closed. Preferably the shield means 14 comprises a first portion 24 and a second portion 26. The first portion 24 is slidably connected to the second portion 26 to allow the shield means 14 to be moved from the open orientation to closed orientation. The first portion 24 can have a slide column 28 about which the second portion 26 slides when it is pushed by a stirrer.

Preferably the shield means 14 comprises sealing material 32, such as sponge or the like, disposed on its periphery to seal the shield means 14 against the sides 36 of the cup 18. Sealing material 34 can also be disposed between the first and second portions 24,26 for sealing them together when they are in the closed orientation. It should be appreciated that when the shield means 14 is in the closed position, the sealing material 32,34 seals the interfaces to effectively isolate the beverage pack 12 from the water in the cup above the shield means 14. The sealing means 32 about the periphery also serves to hold the shield means in the bottom 16 of the cup 18.

It is most desirable for the beverage pack 12 and shield means 14 to float in the water to provide good flow about the beverage pack 12. Thus, the combined density of the beverage pack 12 and the shield means 14 should be made to essentially match that of water or slightly less than. The shield means 14 can be comprised of a sanitary plastic such as the type of conventional disposable cup lids. The plastic can be molded with ridges 36 to provide stiffness and strength to the structure. The second portion 26 can have a center ridge 38 which engages with a slot of the slide column 28. The center ridge 38 provides a surface for a stick member 40, such as a stirrer, to engage to first push the entire shield means 14 to the bottom 16 of the cup 18 and then to slide the first portion 24 towards the second portion to encapsulate the beverage pack 12 within the bottom 16 of the cup 18. The stick member 40 is then removed.

The present invention is also a beverage, system. The system comprises a cup 18 having a bottom 16. There is also a beverage pack 12, such as a tea bag, for adding flavor to a liquid. The beverage system also comprises shield means 14 for encapsulating the pack 12 within the bottom 16 of the cup 18. Preferably, the shield means 14 is connected to the beverage pack 12 with a string 20. The system can also comprise a stick member 40, such as stirrer for pushing the shield means 14 to the bottom 16 of the cup 18. The shield means 14 can be constructed as previously described or other constructions can be used. Preferably, the cup 18 has a notch portion 48 at the bottom 16 for engaging with the shield means 14 when the shield means 14 is pushed down.

What is claimed:

1. A beverage infusion device capable of being inserted in a drinking cup for preparing an infusable beverage comprising:

a water permeable infusion bag containing an infusable beverage material and a shield means connected to said infusion bag for isolating said infusion bag within the bottom of said cup, said shield means comprising first and second portions; and first portion being configured and movable relative to said second portion such that the two portions can assume a first position relative to each other wherein the shield means assumes an open configuration with flow channels such that liquid can flow through said shield means and a second position relative to each other wherein the shield means assumes a closed configuration wherein the flow channels are closed and liquid cannot pass through the shield means, the device being dimensioned and configured such that when said device is placed in said cup with said shield means in said open configuration, the infusion bag is allowed to steep in a liquid in said cup and, after the desired infusion has occurred, the device can be pushed to the bottom of the cup so that the shield means covers the bag in the bottom of the cup and the shield means can be manipulated to its closed configuration thus isolating the infusion bag from all the remaining liquid in the cup above the shield means.

2. A device as described in claim 1 wherein the beverage material comprises tea.

3. A device as described in claim 2 including a string which connects the shield means to the bag.

4. A device as described in claim 3 wherein said first portion is slidably connected to the second portion to allow the shield means to be moved from the open configuration to closed configuration.

5. A device as described in claim 4 wherein the shield means comprises sealing material disposed on its periphery to seal the shield means against the sides of the cup.

6. A device as described in claim 5 wherein the shield means comprises sealing material between the first and second portions for sealing them together when they are in the closed configuration.

7. A device as described in claim 1 wherein the combined density of the infusion bag and the shield means essentially matches that of the liquid in said cup.

8. A device as described in claim 7 wherein the shield means is comprised of plastic and has a plurality of ridges to provide stiffness.

9. A device as described in claim 8 including a stick member for pushing the first portion onto the second portion so that the shield means is in the closed configuration.

10. A beverage system comprising:
the beverage infusion device as recited in claim 1;
a cup having a bottom; and
a stick member for pushing the shield means to the bottom of the cup.

11. A system as described in claim 10 wherein the cup has a notch portion at the bottom for engaging with the shield means.

12. A system as described in claim 11 wherein the beverage material comprises tea.

13. A system as described in claim 12 wherein the beverage material comprises coffee.

* * * * *